(12) United States Patent
Gross et al.

(10) Patent No.: US 6,692,129 B2
(45) Date of Patent: Feb. 17, 2004

(54) DISPLAY APPARATUS INCLUDING RGB COLOR COMBINER AND 1D LIGHT VALVE RELAY INCLUDING SCHLIEREN FILTER

(75) Inventors: Kenneth P. Gross, San Carlos, CA (US); Paul Manhart, Tucson, AZ (US); Richard A. Buchroeder, Tucson, AZ (US)

(73) Assignee: Silicon Light Machines, Sunnyvale, CA (US)

( * ) Notice: Subject to any disclaimer, the term of this patent is extended or adjusted under 35 U.S.C. 154(b) by 0 days.

(21) Appl. No.: 10/237,239

(22) Filed: Sep. 5, 2002

(65) Prior Publication Data

US 2003/0103194 A1 Jun. 5, 2003

Related U.S. Application Data

(60) Provisional application No. 60/337,861, filed on Nov. 30, 2001.

(51) Int. Cl.[7] .................. G03B 21/00; G03B 21/14; G03B 21/28; G02F 1/00; G03H 1/02

(52) U.S. Cl. .................. 353/31; 353/20; 353/84; 353/98; 353/122; 348/762; 348/767; 348/795; 359/28; 359/259; 359/316; 359/588; 359/590; 356/129; 356/518

(58) Field of Search .................. 353/31, 20, 84, 353/122, 98; 348/762, 767, 759, 795; 359/28, 259, 316, 588, 590; 349/30; 382/211; 385/1; 356/518, 129, 362

(56) References Cited

U.S. PATENT DOCUMENTS

| 4,011,009 | A | | 3/1977 | Lama et al. ............ 350/162 R |
|---|---|---|---|---|
| 4,331,972 | A | * | 5/1982 | Rajchman ................ 348/795 |
| 4,836,649 | A | * | 6/1989 | Ledebuhr et al. ............ 349/8 |
| 5,185,660 | A | | 2/1993 | Um ...................... 358/60 |
| 5,923,475 | A | | 7/1999 | Kurtz et al. .............. 359/619 |
| 5,953,161 | A | * | 9/1999 | Troxell et al. ............ 359/618 |
| 5,995,303 | A | | 11/1999 | Honguh et al. ............ 359/708 |
| 6,016,222 | A | * | 1/2000 | Setani et al. ............. 359/571 |
| 6,084,626 | A | | 7/2000 | Ramanujan et al. ........ 347/239 |
| 6,091,521 | A | * | 7/2000 | Popovich .................. 359/15 |
| 6,122,299 | A | | 9/2000 | DeMars et al. ............ 372/20 |
| 6,215,579 | B1 | | 4/2001 | Bloom et al. ............. 359/298 |
| 6,421,179 | B1 | | 7/2002 | Gutin et al. .............. 359/572 |
| 6,480,634 | B1 | * | 11/2002 | Corrigan ................... 385/4 |

FOREIGN PATENT DOCUMENTS

| EP | 0 322 714 A2 | 7/1989 | ............ G02B/5/30 |
|---|---|---|---|
| EP | 1 003 071 A2 | 5/2000 | ............ G03B/27/72 |
| EP | 1 040 927 A2 | 10/2000 | ............ B41J/2/455 |

* cited by examiner

Primary Examiner—Russell Adams
Assistant Examiner—Magda Cruz
(74) Attorney, Agent, or Firm—Haverstock & Owens LLP

(57) ABSTRACT

The optical system includes a plurality of light modulators, one or more combining filters, and an optical relay system including a filter. Each light modulator modulates a corresponding incident light beam. The one or more combining filters superimpose the modulated light beams from each of the plurality of light modulators. The optical relay system filters the superimposed light and relays the filtered light to an image plane.

20 Claims, 4 Drawing Sheets

DISPLAY APPARATUS INCLUDING RGB COLOR COMBINER AND 1D LIGHT VALVE RELAY INCLUDING SCHLIEREN FILTER

RELATED APPLICATIONS

This application claims priority under 35 U.S.C. §119(e) of the co-pending U.S. Provisional patent application Ser. No. 60/337,861 filed Nov. 30, 2001 and entitled "Display Apparatus Including RGB Color Combiner and 1D Light Valve Relay Including Schlieren Filter." The Provisional patent applications Ser. No. 60/337,861 filed Nov. 30, 2001 and entitled "Display Apparatus Including RGB Color Combiner and 1D Light Valve Relay Including Schlieren Filter" is also hereby incorporated by reference.

FIELD OF THE INVENTION

The present invention relates to a display apparatus. More particularly, the present invention relates to a display apparatus including a RGB color combiner and a 1D light valve relay including a Schlieren filter.

BACKGROUND OF THE INVENTION

Light modulators are used to modulate one or more wavelengths of light. Light modulators can have applications in display, print and electrical device technologies. Examples of light modulators, and in particular grating light valve type devices, which utilize suspended micro-ribbon structures to modulate light are disclosed in the U.S. Pat. Nos. 5,311,360, 5,841,579 and 5,808,797, all issued to Bloom et al., the contents of which are hereby incorporated by reference.

Briefly, a grating light valve type device described in the above referenced patents includes a series of elongated, reflective ribbons arranged adjacently and in parallel. When the ribbons lie in an un-deflected, or flat, state, an incident beam of light reflects off the grating light valve type device as a mirror. If alternating ribbons are pulled down, or deflected, then the incident light diffracts. In operation, a through-state is considered to be when the alternating ribbons are deflected by a predetermined distance, thereby obtaining maximum diffraction of the incident light, and the diffracted first order light may be collected. Inefficiencies arise since the first order light is not the only diffracted light in the deflected state. Higher orders of light are also produced including second order, third order, etc. These higher orders are not collected and are therefore wasted. This reduces efficiency.

Problems arise in association with the collection process of the first order light. When the incident light is diffracted in the through-state, different wavelengths diffract at different angles. Larger wavelengths have larger diffraction angles. As such, any wavelength combiner used for collecting the first order light must be sufficiently large to account for the varying wavelength diffraction angles. A wavelength combiner is also called a wavelength multiplexer, examples of which include a dichroic filter, a diffraction grating, and an array waveguide. Unfortunately, the larger the combiner, the less efficient is the collection process and the lower the contrast ratio provided.

Design of the optical system must not only account for collecting of the plus and minus first order light, but also must isolate the first order light from the higher order light and any reflected light. Since the different wavelengths diffract at different angles, the optical system must ensure sufficient discrimination of zero and first order diffraction of all wavelengths encountered in the system. Considering the isolation and collection constraints of such a system, the optical design considerations using a conventional grating light valve type device are substantial.

What is needed is an optical system utilizing light modulators that efficiently combines multiple wavelengths of light and also isolates, or filters, specified states of the combined light.

SUMMARY OF THE INVENTION

An embodiment of the present invention includes an optical system. The optical system includes a plurality of light modulators, one or more combining filters, and an optical relay system including a filter. Each light modulator modulates a corresponding incident light beam. The one or more combining filters superimpose the modulated light beams from each of the plurality of light modulators. The optical relay system filters the superimposed light and relays the filtered light to an image plane.

Each light modulator is preferably a grating light valve type device. The optical relay system is preferably a modified Offner relay type device including a primary mirror and a secondary mirror. The primary mirror preferably receives the superimposed light from the one or more combining filters off-axis. The filter within the modified Offner relay type device is preferably located at a transform plane of the modified Offner relay type device. The secondary mirror preferably includes the filter. The filter within the optical relay system is preferably a Schlieren type filter. The combining filters can be dichroic filters.

Each light modulator preferably modulates the light by reflecting a portion of the incident light beam as zero order light and by diffracting another portion of the incident light beam as first order light. The zero order light can be relayed to the image plane or the first order light can be relayed to the image plane. The optical system can also include a color correction lens coupled between one or more of the plurality of light modulators and the combining filters.

DETAILED DESCRIPTION OF THE EMBODIMENTS

Figure 1:
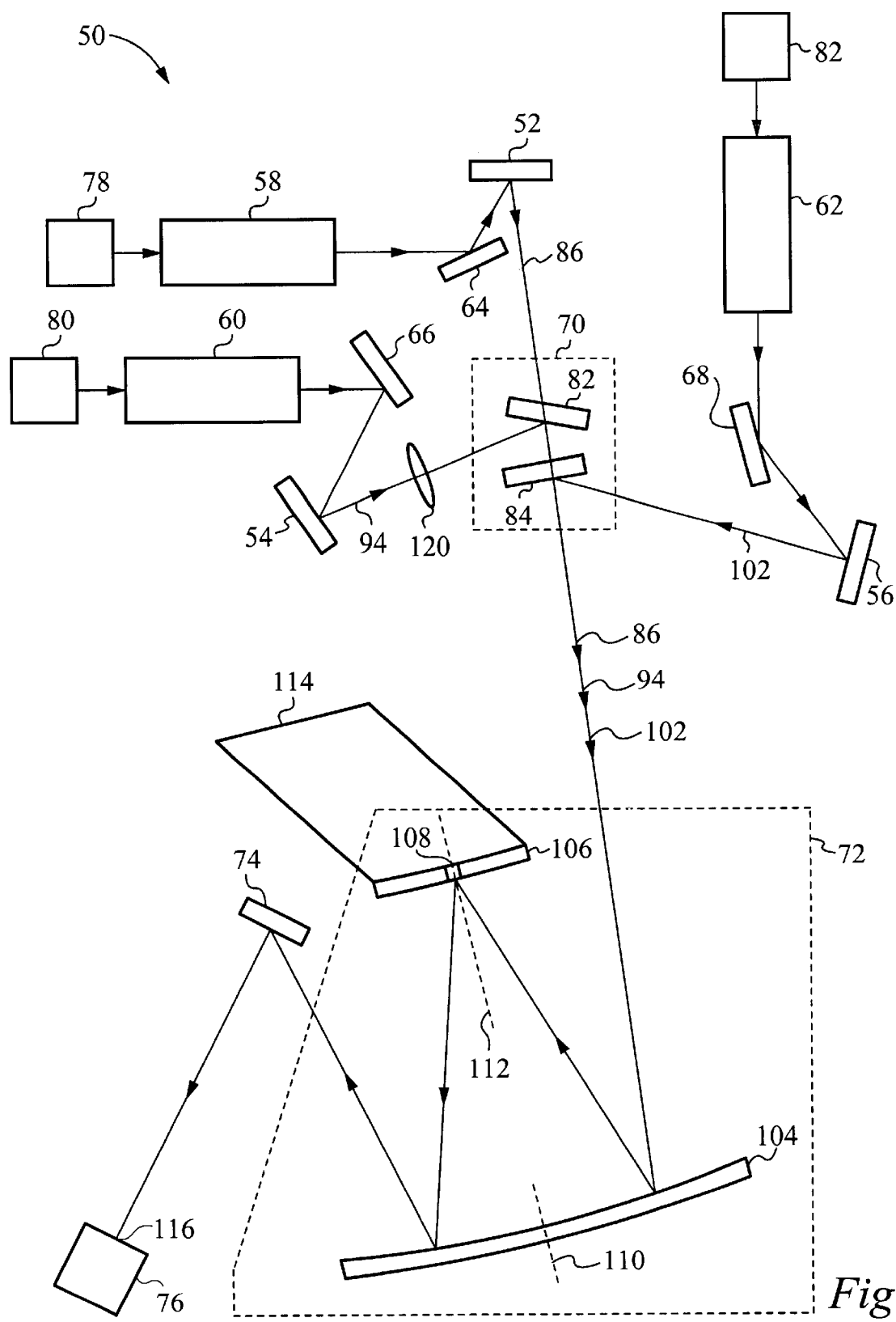
FIG. 1 illustrates an optical system according to a preferred embodiment of the present invention.

Embodiments of a front-end optical system of the present invention include a RGB color combiner and a 1D light valve relay including a Schlieren type filter. Embodiments of the present invention are preferably related to display applications using a light modulator. Preferably, the light modulator is a grating light valve type device. The front-end optical system uses dichroic filters and a modified Offner relay type device to combine light outputs from three grating light valve type devices, which represent three primary colors to span the visual space. The three colors are combined with the dichroic filters and then the three combined colors are relayed and filtered by the modified Offner relay type device, which then forms a basic three-color, 1D image. By relaying the 1D image to a display screen and scanning the 1D image across the display screen, a 2D image is formed on the display screen.

Embodiments of the present invention described herein relate to an efficient and novel means for combining three RGB visible wavelengths, and suitably relaying the superimposed light modulator outputs to a 1D image on a common, diffraction limited image plane. An optical relay system including the modified Offner relay type device is used to generate a real three-color image and also serves as a Schlieren type filter to select appropriate grating light valve device states suitable for high contrast image projection. Preferably, monochromatic laser light is used to illuminate an equal number of light modulators, one for each primary color. The optical Schlieren type filter is preferably used to relay a diffracted light component, preferably a first order diffracted light, from the illuminated light modulators to the diffraction limited image plane, while simultaneously blocking the transmission of a specularly reflected light component, as well as any stray light, from the light modulator. In this preferred case, the optical system of the present invention is said to operate in the first order.

Alternatively, the optical Schlieren type filter is used to relay the specularly reflected light component from the illuminated light modulators to the diffraction limited image plane, while simultaneously blocking the transmission of the diffracted light component from the light modulator. In this alternative case, the optical system of the present invention is said to operate in the zero order.

In general, the relayed image of the color combined light passes through a field stop to suppress unwanted energy from exiting the system, and inputs can be further processed and projected onto a large screen using a conventional projection objective. In addition to Schlieren type filtering for high image contrast, embodiments of the present invention allow for correcting, or compensating, for color aberrations, both axial and lateral, of the final projection objective. In the preferred embodiment where the optical system operates in the first order as described above, a full dynamic range contrast ratio of greater than about 2000:1 can be achieved at the diffraction limited plane output of the relay.

An optical system 50 according to a preferred embodiment of the present invention is illustrated in FIG. 1. The preferred optical system 50 comprises first, second, and third light modulators, 52, 54, and 56, respectively, first, second, and third illumination light rails, 58, 60, and 62, respectively, first, second, and third mirrors, 64, 66, and 68, respectively, color combining optics 70, a modified Offner relay type device 72, a fourth mirror 74, and a projection lens 76. Preferably, the light modulators 52, 54, and 56 are grating light valve type devices.

The first illumination light rail 58 is optically coupled to the first light modulator 52. The first light modulator 52 is optically coupled to the color combining optics 70. The second illumination light rail 60 is optically coupled to the second light modulator 54. The second light modulator 54 is optically coupled to the color combining optics 70. The third illumination light rail 62 is optically coupled to the third light modulator 56. The third light modulator 56 is optically coupled to the color combining optics 70.

The color combining optics 70 are optically coupled to the modified Offner relay type device 72. The modified Offner relay type device 72 is optically coupled to the fourth mirror 74. The fourth mirror is optically coupled to the projection lens 76. The projection lens 76 is optically coupled to a display screen (not shown).

Preferably, the first illumination light rail 58 couples a red light source 78 of approximate wavelength 630–650 nm to the first light modulator 52. Preferably, the second illumination light rail 60 couples a green light source 80 of approximate wavelength 520–540 nm to the second light modulator 54. Preferably, the third illumination light rail 62 couples a blue light source 82 of approximate wavelength 440–460 nm to the third light modulator 56.

Alternatively, the first, second, and third illumination light rails, 58, 60, and 62, respectively, couple other light sources to the first, second, and third light modulators, 52, 54, and 56, respectively. The first, second, and third illumination light rails, 58, 60, and 62, respectively, produce first, second, and third wedge shaped focus, respectively, which produces a line illumination at the first, second, and third light modulators, 52, 54, and 56, respectively.

In operation, red, green, and blue light is incident onto first, second, and third light modulators, 52, 54, and 56, respectively, using the first, second, and third illumination light rails, 58, 60, and 62, respectively. The red, green, and blue light comes off of the first, second, and third light modulators, 52, 54, and 56, respectively, at a design angle.

Figure 2:
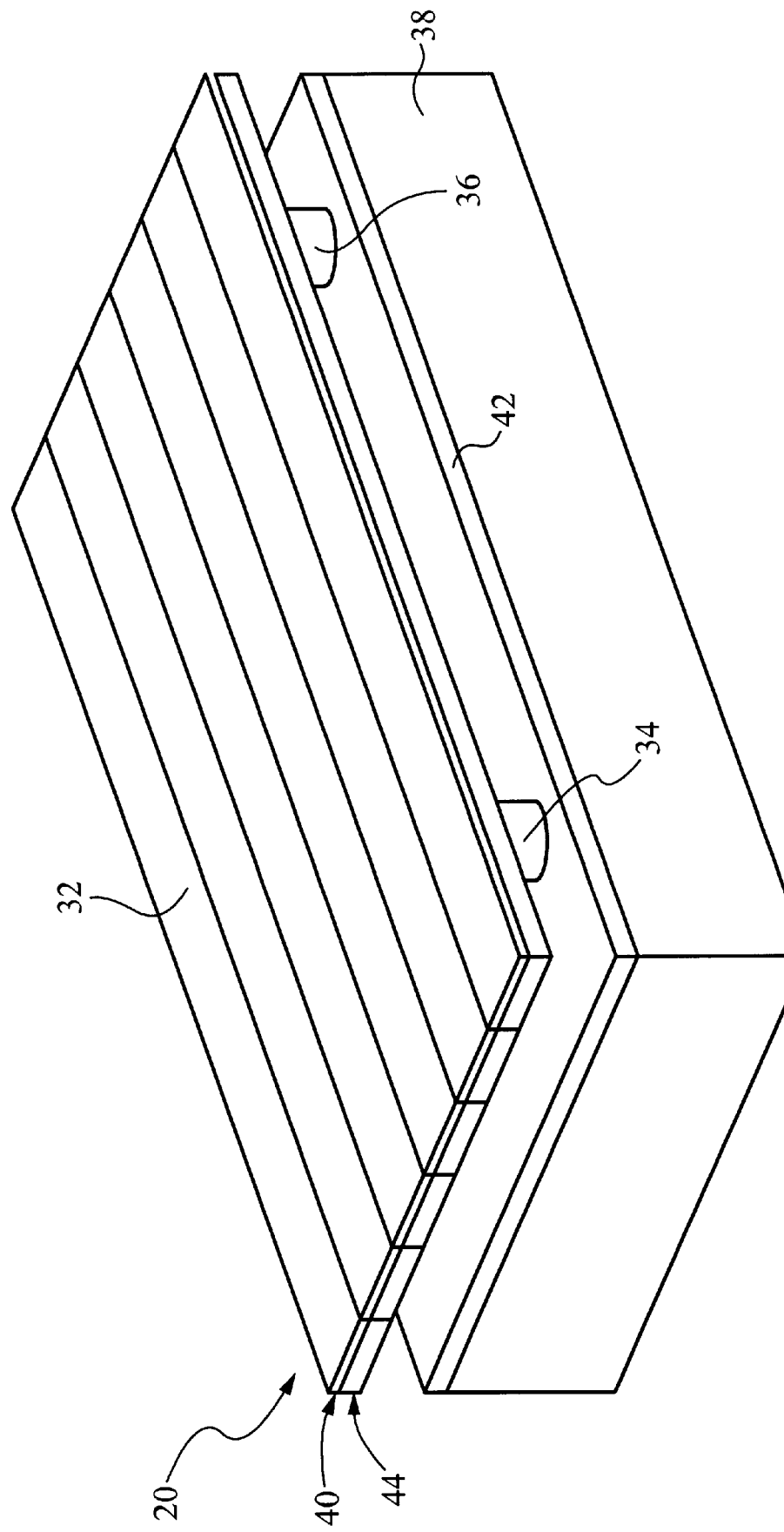
FIG. 2 illustrates a preferred embodiment of a grating light valve type device included within the optical system of FIG. 1.

An exemplary grating light valve type device 20 according to the preferred embodiment of the present invention is illustrated in FIG. 2. The grating light valve type device 20 preferably comprises elongated elements 32 suspended by first and second posts, 34 and 36, above a substrate 38. The elongated elements 32 comprise a conducting and reflecting surface 40. The substrate 38 comprises a conductor 42. In operation, the grating light valve type device 20 operates to produce modulated light selected from a reflection mode and a diffraction mode.

Figure 3:
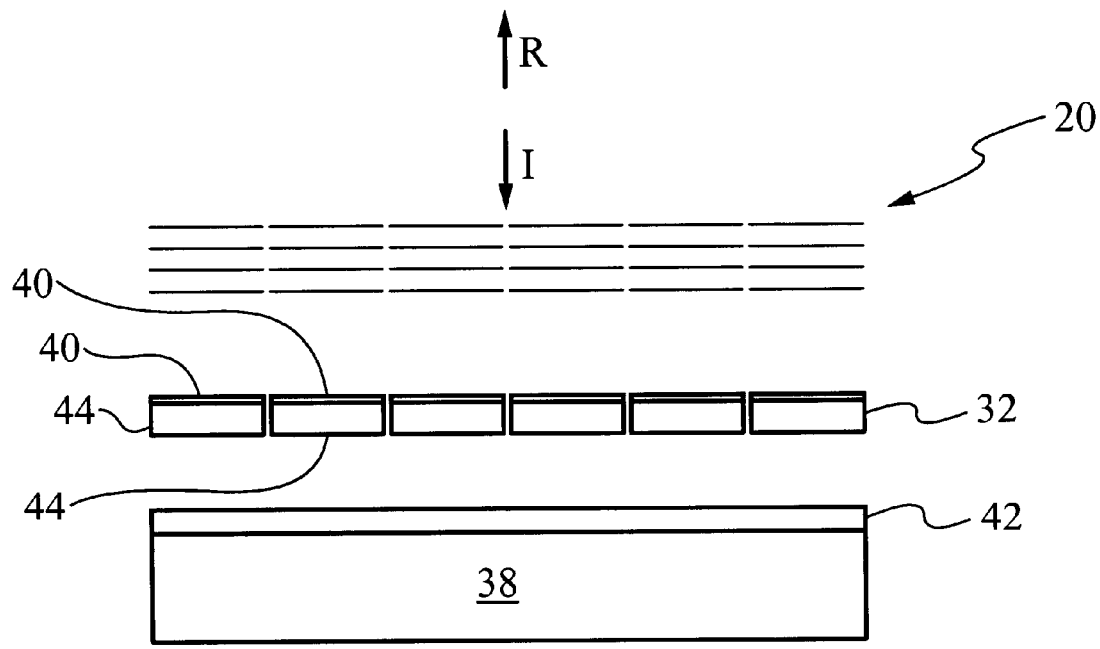
FIG. 3 illustrates a cross-section of the grating light valve type device in a reflection mode.
Figure 4:
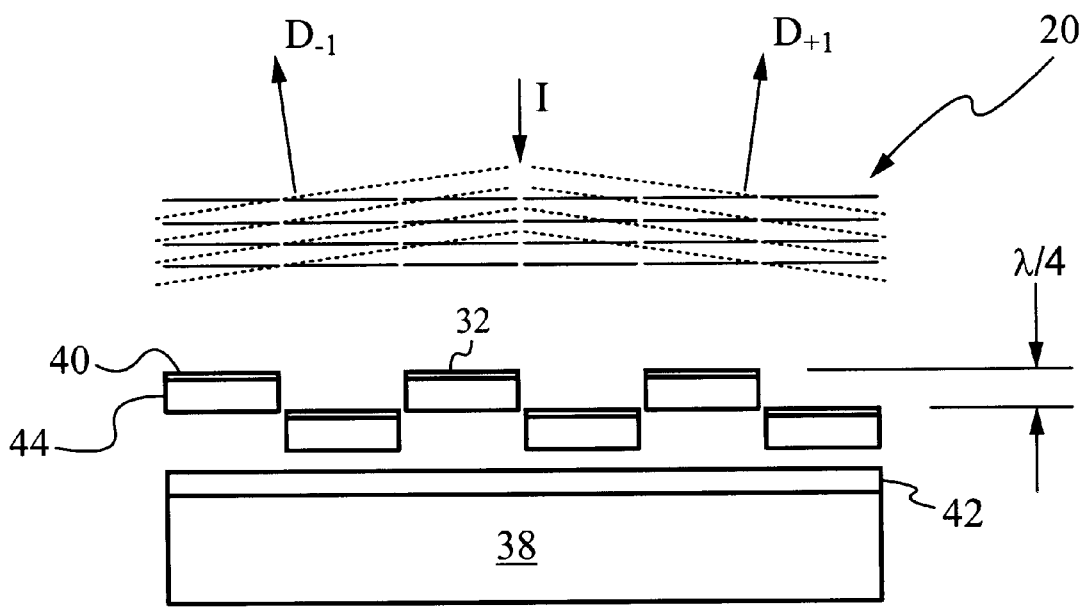
FIG. 4 illustrates a cross-section of the grating light valve type device in a diffraction mode.

A cross-section of the grating light valve type device 20 of the present invention is further illustrated in FIGS. 3 and 4. The grating light valve type device 20 comprises the elongated elements 32 suspended above the substrate 38. The elongated elements comprise the conducting and reflecting surface 40 and a resilient material 44. The substrate 38 comprises the conductor 42.

FIG. 3 depicts the grating light valve type device 20 in the reflection mode. In the reflection mode, the conducting and reflecting surfaces 40 of the elongated elements 32 form a plane so that incident light I reflects from the elongated elements 32 to produce reflected light R.

FIG. 4 depicts the grating light valve type device 20 in the diffraction mode. In the diffraction mode, an electrical bias causes alternate ones of the elongated elements 32 to move toward the substrate 38. The electrical bias is applied between the reflecting and conducting surfaces 40 of the alternate ones of the elongated elements 32 and the conductor 42. The electrical bias results in a height difference of a quarter wavelength $\lambda/4$ of the incident light I between the alternate ones of the elongated elements 32 and non-biased ones of the elongated elements 32. The height difference of the quarter wavelength $\lambda/4$ produces diffracted light including plus one and minus one diffraction orders, $D_{+1}$, and $D_{-1}$.

FIGS. 3 and 4 depict the grating light valve type device 20 in the reflection and diffraction modes, respectively. For a deflection of the alternate ones of the elongated elements 32 of less than a quarter wavelength $\lambda/4$, the incident light I both reflects and diffracts producing the reflected light R and the diffracted light including the plus one and minus one diffraction orders, $D_{+1}$, and $D_{-1}$. In other words, by deflecting the alternate ones of the elongated elements less than the quarter wavelength $\lambda/4$, the grating light valve type device 20 produces a variable reflectivity, which provides a gray-scale effect in display applications.

It will be readily apparent to one skilled in the art that the conducting and reflecting surface 40 can be replaced by a multilayer dielectric reflector and a conducting element where the conducting element is buried within each of the elongated elements 32 or within just the alternate ones of the elongated elements 32. Further, it will be readily apparent to one skilled in the art that the conducting and reflecting surface 40 can be coated with a transparent layer such as an anti-reflective layer.

While FIGS. 2, 3, and 4 depict the grating light valve type device 20 having six of the elongated elements 32, the grating light valve type device 20 preferably includes more of the elongated elements 32. By providing more of the elongated elements 32, the elongated elements 32 are able to function as groups, which are referred to as pixels. Preferably, each pixel is a group of two of the elongated elements 32. Alternatively, each pixel is a group of more elongated elements 32. Preferably, the grating light valve type device 20 includes 3,240 of the pixels. Alternatively, the grating light valve type device 20 includes more or less of the pixels.

It will be readily apparent to one skilled in the art that the term "pixel" is used here in the context of an element of a light modulator rather than its more specific definition of a picture element of a display.

Referring to FIG. 1, the red, green and blue light directed from the light modulators 52, 54 and 56, respectively, are combined by the color combining optics 70. Collinear color combining is preferably accomplished using a minimum of two dichroic plates, where the primary reflecting surface of each plate is composed of a long-wave pass multilayer coating. The secondary surface of each plate has a multilayer anti-reflection coating. The dichroic surface of each plate is designed for high reflectivity for a selected primary color or band of primaries, and is highly transmittable for the "passband". The anti-reflective coated second surface of the plate can be narrow-band or broad-band depending on the application. Preferably, broad-band visible coatings are used due to their relatively low cost and generally good performance over a broad angular range. Preferably, a nearly symmetrical cluster of the light modulators 52, 54 and 56 are chosen for combining, resulting in a triangular arrangement of approximately 120 degrees between each light channel.

Figure 5:
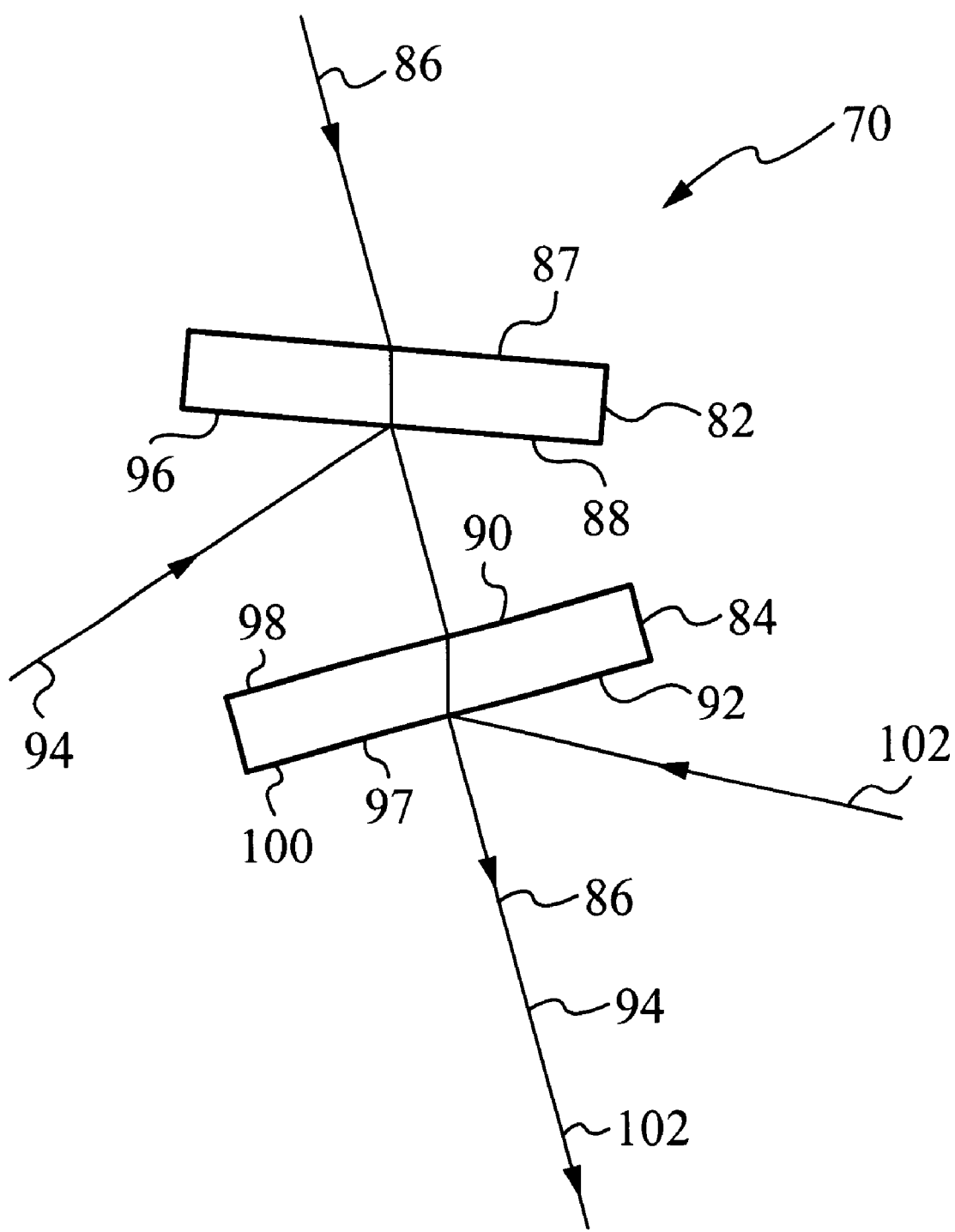
FIG. 5 illustrates a color combining optics included within the optical system of FIG. 1.

The color combining optics 70 of the present invention are further illustrated in FIG. 5. The color combining optics 70 comprise first and second dichroic plates, 82 and 84. The red light 86 couples from the first light modulator 52 (FIG. 1) to the color combining optics 70. The first dichroic plate 82 comprises a slight wedge and also comprises first and second red anti-reflective coatings, 87 and 88. The second dichroic plate 84 comprises third and fourth red anti-reflective coatings, 90 and 92. Thus, the red light 86 refracts through the first and second dichroic plates, 82 and 84.

The green light 94 couples from the second light modulator 54 (FIG. 1) to the color combining optics 70. The first dichroic plate 82 comprises a green reflective coating 96. The second dichroic plate comprises first and second green anti-reflective coatings, 98 and 100. Thus, the green light 94 reflects from the first dichroic plate 82 and refracts through the second dichroic plate 84, which combines the green light 94 with the red light 86.

It will be readily apparent to one skilled in the art that the second red anti-reflective coating 88 and the green reflective coating 96 preferably comprise a first multilayer integrated coating.

The blue light 102 couples from the third light modulator 56 (FIG. 1) to the color combining optics 70. The second dichroic plate 84 comprises a blue reflective coating 97. Thus, the blue light 102 reflects from the second dichroic plate 84, which combines the blue light 102 with the red and green light, 86 and 94.

It will be readily apparent to one skilled in the art that the third red anti-reflective coating 90 and the first green anti-reflective coating 98 preferably comprise a second multilayer integrated coating. Further, it will be readily apparent to one skilled in the art that the fourth red anti-reflective coating 92, the second green anti-reflective coating 100, and the blue reflective coating 97 preferably comprise a third multilayer integrated coating.

Unlike some conventional color combining prisms or plates, the color combining optics 70 accommodate both polarization states S and P up to a numerical aperture of f/3. The plates 82 and 84 are preferably arranged at substantially 30 degrees incidence or less in order to achieve high performance for both S and P polarization states. Since the plates 82 and 84 are of finite thickness and the plates 82 and 84 are typically used off-axis with un-collimated light, coma and astigmatism, left uncompensated, can result in excessive optical aberration, especially at large numerical apertures. By using plates 82 and 84 oriented at opposite angles to the incident light, the resultant coma term can be made vanishingly small. Astigmatism can be controlled without the use of additional cylindrical optical components. In embodiments of the present invention, each plate 82 and 84 is wedged slightly and differently so as to adjust the coma correction enough to compensate for the longitudinal astigmatism. Such a color combining arrangement remains color corrected and diffraction limited for numerical apertures less than or equal to f/3. The color combining arrangement also works for anamorphic systems that are on-axis in the plane of incidence of the color combining plate and where off-axis fields are restricted to the transverse or orthogonal plane, and are essentially at normal incidence. This is the case for a 1D light modulator, as illustrated in the above embodiments of the present invention.

Once combined by the color combining optics 70, the three colors can be suitably imaged with a finite conjugate optical system designed to relay the light from the light modulators 52, 54 and 56 to a common focal plane. By using an all reflective Offner system, the combined color inputs can be relayed to an intermediate image plane, such as intermediate focus point 116 as depicted in FIG. 1, without incurring chromatic aberrations. This can be accomplished using two nearly concentric mirrors, where a primary mirror surface is used twice. The focal lengths and size of the mirrors are chosen to allow the input and output light to be aligned off-axis, to accommodate relatively large unobstructed apertures, and to provide adequate working distances for both conjugate arms of the relay.

Returning to FIG. 1, the red, green, and blue light, 86, 94, and 102, respectively, couple from the color combining optics 70 to the modified Offner relay type device 72. The modified Offner relay type device 72 comprises a first focus that is coincident a position of the first, second, and third light modulators, 52, 54, and 56, respectively. The modified Offner relay type device 72 comprises a primary mirror 104 and a secondary mirror 106. Preferably, the primary mirror 104 and the secondary mirror 106 comprise spherical mirrors. Preferably, the secondary mirror 106 is located at a transform plane of the modified Offner relay type device. The secondary mirror 106 comprises a slit 108 where Schlieren type filtering occurs.

The red, green, and blue light, 86, 94, and 102, respectively, couple to the primary mirror 104 off a primary mirror optical axis 110 and reflects to the secondary mirror 106. Preferably, the secondary mirror 106 performs the Schlieren type filtering by reflecting light diffracted by the first, second, and third light modulators, 52, 54, and 56, respectively, and by passing light reflected by the first, second, and third light modulators, 52, 54, and 56, respectively, through the slit 108 in the secondary mirror 106.

In particular, the Schlieren type filtering is preferably performed as follows. The red, green, and blue light, 86, 94, and 102, respectively, diffracted by the first, second, and third light modulators, 52, 54, and 56, respectively, illuminate the secondary mirror 106 off of a secondary mirror optical axis 112 in lines parallel to an optical system plane defined by FIG. 1. The red, green, and blue light, 86, 94, and 102, respectively, reflected by the first, second, and third light modulators, 52, 54, and 56, respectively, pass through the slit 108 of the secondary mirror 106 on the secondary mirror optical axis 112 in a line parallel to the optical system plane. The red, green, and blue light, 86, 94, and 102, respectively, that passes through the slit 108 is preferably collected by a beam dump 114. The beam dump 114 prevents light not reflected by the secondary mirror 106 from causing a stray light problem.

Alternatively, the Schlieren type filtering is performed by an alternative modified Offner relay type device. In the alternative modified Offner relay type device, the secondary mirror 106 is replaced by an alternative secondary mirror. The alternative secondary mirror comprises two slits where light diffracted by the first, second, and third light modulators, 52, 54, and 56, respectively, illuminate the alternative secondary mirror. The alternative secondary mirror does not include the slit 108. In the alternative Schlieren type filtering, light reflected by the first, second, and third light modulators, 52, 54, and 56, respectively, reflects from the alternative secondary mirror while light diffracted by the first, second, and third light modulators, 52, 54, and 56, respectively, passes through the alternative slits.

An important benefit is that the modified Offner relay type device 72 is achromatic. That is there are no chromatic aberrations because the modified Offner relay type device 72 is reflective. Since the modified Offner relay type device 72 is reflective and not refractive, there is no dispersion caused by differential refraction of the red, green, and blue light. With the modified Offner relay type device, the red, green, and blue light are treated essentially identically. Another important aspect is that the modified Offner relay type device 72 provides a convenient place to put a hole or slit to do the Schlieren type filtering.

After the red, green, and blue light, 86, 94, and 102, respectively, are reflected by the secondary mirror 106, the red, green, and blue light, 86, 94, and 102, respectively, couple to the primary mirror 104, where the red, green, and blue light, 86, 94, and 102, respectively, are again reflected. The red, green, and blue light 86, 94, and 102, respectively, then couple to the fourth mirror 74, which reflects the red, green, and blue light, 86, 94, and 102, respectively, to a focus point 116. The red, green, and blue light, 86, 94, and 102, respectively, then proceed to the projection lens 76.

The modified Offner relay type device 72 is a 2f/2f configuration with unity magnification. So, in the preferred embodiment the red, green, and blue light, 86, 94, and 102, respectively, have been relayed from the first, second, and third light modulators, 52, 54, and 56, respectively, and at the same time a reflected portion has been filtered from the red, green, and blue light, 86, 94, and 102, respectively. The color combining optics 70 and the modified Offner relay type device 72 perform functions of combining color, filtering to establish contrast of the light modulators output, and relaying to form a real image without magnification at the focus point 116. So, all three colors are combined, filtered and relayed at the focus point 116. The image at the focus point 116 is then projected onto a screen (not shown) via the projection lens 76 and scanned with a mirror to form a two dimensional image on the screen.

The unity magnification of the modified Offner relay type device 72 provides optimum performance, minimum cost, and allows a clear aperture of the projection lens 76 to remain as small as possible, with an achievable numerical aperture.

The secondary mirror 106, with a radius of one-half that of the primary mirror 104, is at the back focal length of the primary mirror 104, and hence serves as a Fourier or transform plane and aperture stop. By sculpting the secondary mirror 106 appropriately, the input half of the modified Offner relay type device 72 is used as an optical or Schlieren type filter, and is preferably designed to reflect only the light modulators diffraction angles of interest, which carry information content. All other unwanted frequencies are passed through apertures in or around the secondary mirror 106, and are suitably terminated with the beam dump 114. For small field angles of approximately 5 degrees, and apertures of up to f/2.5, the 1:1 image field at the focus point 116 is essentially flat, diffraction limited and free of color aberration.

An Offner relay is essentially an achromatic relay system that is a reflective optical system. Reflective optical systems tend to want to form an image back on top of itself. This is difficult to deal with because the two images then have to be separated. The configuration of the modified Offner relay type device 72 accepts the incident combined light off-axis to the primary mirror, which allows the formation of an achromatic image other than right back on itself. If the incident combined light is directed on-axis to the modified Offner relay type device 72, then a reflected image forms back on itself However, by accepting the incident combined light off-axis, a substantial amount of an optical aberration called coma is created. Coma has a parity such that when the combined light is reflected back onto the primary mirror a second time, at the exact opposite side of the optical axis that the combined light initially impinges the primary mirror, the coma that is created on the first bounce is essentially eliminated. Summarily, the Offner relay type system relays with a reflective system and forms an image not right back on top of itself, but avoids the principle off-axis aberration coma.

The coma is created in the first reflection from the primary mirror and the coma is canceled in the second reflection from the primary mirror. The modified Offner relay type device also forms a transform location where frequency plane filtering is performed, for example the Schlieren type filtering. In the frequency plane filtering, angle becomes position. The angle is distinct for the diffraction from a light modulator. Light diffracted by the light modulator diffracts at two angles for plus one and minus one diffraction orders. The plus one and minus one diffraction orders form two distinct positions on the secondary mirror. Light reflected by the light modulator (also referred to as zero order light) forms another distinct position on the secondary mirror. This is the optimum place of contrast for performing the Schlieren type filtering. At another location an imaging and transform relationship are mixed in a complex way, so the Schlieren type filtering is not as clean. The secondary mirror is placed at the transform plane to optimally perform Schlieren type filtering. In the preferred embodiment, a hole or slit (a Schlieren aperture) is placed in the secondary mirror, the zero order light is dumped, and the plus one and minus one diffraction orders are collected. This establishes contrast in the preferred optical system. This implementation is referred to as first-order operation since the plus one and minus one diffraction orders are used to establish the image.

Embodiments of the present invention provide an un-obscured three-color image plane, which is well corrected and accessible. The image can be modified or filtered further with apertures, slits or other means, and is suitable for projection with an external objective lens. Since each RGB color is admitted or injected separately, a number of unique color compensation schemes are achievable with the optical system of the present invention described herein. One such scheme allows for correction of axial and lateral color, which may be necessary due to the inherent chromatic aberrations of an objective lens that follows the Offner image. Most projection lens designs posses under-corrected longitudinal and lateral color to some degree. Apochromatic objectives are costly and difficult to design and fabricate. Such color aberrations can be corrected or compensated by varying the conjugate distances of the light modulators 52, 54 and 56 with respect to the modified Offner relay type device 72. The modified Offner relay type device 72 is extremely tolerant to object conjugates. Lateral color is difficult to correct in projection objectives, and usually requires careful choice and use of exotic glasses depending on the degree of color correction required. Lateral color correction is accomplished in embodiments of the present invention by using a weak field lens in the input arm of the relay.

Referring to FIG. 1, the preferred optical system 50 includes a color compensation lens 120 located in the green light input path to the color combining optics 70. Off-axis field angles are changed only slightly, thereby reducing any chromatic differences in magnification as a function of wavelength or color channel. The projection lens 76 resolves red and blue chromatic aberration while the projection lens 76 in conjunction with the color compensation lens 120 resolves green chromatic aberration. Lateral chromatic aberration is essentially differences in magnification in colors. To correct the lateral chromatic aberration, a small amount of optical power is added to the green using the color compensation lens 120 and the red and blue are corrected in the projection lens 76.

The color compensation lens 120 preferably comprises a cylindrical lens with curvature perpendicular to the optical system plane defined by FIG. 1. Alternatively, the color compensation lens 120 comprises a spherical lens.

An alternate embodiment of the optical system 50 reflects specular light, for example zero order light, from the first, second, and third light modulators, 52, 54, and 56, respectively, and dumps first order light. In the alternative embodiment, the secondary mirror 106 is replaced by an alternative secondary mirror having two slits which would pass, rather than reflect, the first order light.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. An optical system comprising:
 (a.) a plurality of light modulators, wherein each light modulator modulates a corresponding incident light beam;
 (b.) one or more combining filters for superimposing the modulated light beams from each of the plurality of light modulators; and
 (c.) an optical relay system including a filter, a primary mirror and a secondary mirror, wherein the optical relay system filters the superimposed light and relays the filtered light to an image plane.

2. The optical system according to claim 1 wherein each light modulator includes a grating light valve type device.

3. The optical system according to claim 1 wherein the optical relay system includes a modified Offner relay type device including the primary mirror and the secondary mirror.

4. The optical system according to claim 3 wherein the primary mirror receives the superimposed light from the one or more combining filters off-axis.

5. The optical system according to claim 3 wherein the filter within the modified Offner relay type device is located at a transform plane of the modified Offner relay type device.

6. The optical system according to claim 5 wherein the secondary mirror includes the filter.

7. The optical system according to claim 1 wherein the filter within the optical relay system includes a Schlieren type filter.

8. The optical system according to claim 1 wherein the combining filters include dichroic filters.

9. The optical system according to claim 1 wherein each light modulator modulates the light by reflecting a portion of the incident light beam as zero order light and by diffracting another portion of the incident light beam as first order light.

10. The optical system according to claim 9 wherein the zero order light is relayed to the image plane.

11. The optical system according to claim 9 wherein the first order light is relayed to the image plane.

12. The optical system according to claim 1 further comprising a color correction lens coupled between one or more of the plurality of light modulators and the combining filters.

13. A method of combining, relaying and filtering a plurality of light beams comprising:
 (a.) modulating each of the plurality of light beams;
 (b.) combining each of the modulated light beams;
 (c.) relaying the combined light beams to an image plane using a primary mirror and a secondary mirror; and
 (d.) filtering the combined light beam while the combined light beam is relayed to the image plane.

14. The method according to claim 13 wherein each of the plurality of light beams is modulated by reflecting a portion of the light beam as zero order light and by diffracting another portion of the light beam as first order light.

15. The method according to claim 14 wherein the combined light beams are filtered by passing the zero order light and reflecting the first order light such that the first order light is relayed to the image plane.

16. The method according to claim 14 wherein the combined light beams are filtered by passing the first order light and reflecting the zero order light such that the zero order light is relayed to the image plane.

17. An optical system comprising:
(a.) means for modulating each of the plurality of light beams;
(b.) means for combining each of the modulated light beams;
(c.) means for relaying the combined light beams to an image plane, wherein the means for relaying comprises a primary mirror and a secondary mirror; and
(d.) means for filtering the combined light beam while the combined light beam is relayed to the image plane.

18. The optical system according to claim 17 wherein the means for modulating comprises a plurality of grating light valve type devices, each grating light valve type device corresponding to one of the plurality of light beams.

19. The optical system according to claim 18 wherein the means for relaying comprises a modified Offner relay type device including the primary mirror and the secondary mirror.

20. The optical system according to claim 19 wherein the means for filtering comprises the secondary mirror such that the secondary mirror is configured as a Schlieren type filter.

* * * * *